United States Patent
Nasu (10) Patent No.: US 10,871,994 B2
(45) Date of Patent: Dec. 22, 2020

(54) INFORMATION PROCESSING DEVICE AND INFORMATION PROCESSING METHOD

(71) Applicant: Mitsubishi Electric Corporation, Tokyo (JP)

(72) Inventor: Osamu Nasu, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/615,409

(22) PCT Filed: Jul. 31, 2017

(86) PCT No.: PCT/JP2017/027741
§ 371 (c)(1),
(2) Date: Nov. 21, 2019

(87) PCT Pub. No.: WO2019/026139
PCT Pub. Date: Feb. 7, 2019

(65) Prior Publication Data
US 2020/0104172 A1    Apr. 2, 2020

(51) Int. Cl.
*G06F 9/50* (2006.01)
*G06F 16/2458* (2019.01)
*G06F 9/48* (2006.01)
*G06F 17/18* (2006.01)

(52) U.S. Cl.
CPC ............ *G06F 9/50* (2013.01); *G06F 9/4881* (2013.01); *G06F 16/2477* (2019.01); *G06F 17/18* (2013.01)

(58) Field of Classification Search
None
See application file for complete search history.

(56) References Cited

U.S. PATENT DOCUMENTS 6,407,736 B1 *   6/2002   Regan ............... G06T 15/005
                                                        345/422
2002/0029331 A1   3/2002   Toyoyama et al.
2006/0259731 A1   11/2006  Oshins et al.
(Continued)

FOREIGN PATENT DOCUMENTS

JP    2001-282558 A    10/2001
JP    2002-077297 A     3/2002
(Continued)

OTHER PUBLICATIONS

International Search Report and Written Opinion dated Aug. 29, 2017 for PCT/JP2017/027741 filed on Jul. 31, 2017, 8 pages including English Translation of the International Search Report.
(Continued)

Primary Examiner — Justin C Mikowski
(74) Attorney, Agent, or Firm — Xsensus LLP (57) ABSTRACT

An information processing device includes a data input unit that receives time-series data from an external device, a first processing unit that adds time information to data acquired from the data input unit and processes data to which the time information has been added, on a real-time operating system that performs a process within a specified time period, and a second processing unit that processes data to which the time information has been added, on a non-real-time operating system.

11 Claims, 7 Drawing Sheets

(56) References Cited

U.S. PATENT DOCUMENTS

| | | | |
|---|---|---|---|
| 2008/0231632 A1* | 9/2008 | Sulatycke | G06T 15/005 345/424 |
| 2011/0066782 A1 | 3/2011 | Oshins et al. | |
| 2013/0332925 A1 | 12/2013 | Motai et al. | |
| 2015/0103962 A1* | 4/2015 | Tsukamoto | H03M 1/125 375/355 |
| 2016/0041883 A1 | 2/2016 | Motai et al. | |
| 2017/0177431 A1 | 6/2017 | Motai et al. | |
| 2017/0203436 A1* | 7/2017 | Wei | G06F 9/4887 |
| 2017/0330599 A1* | 11/2017 | Liu | G11B 27/10 |

FOREIGN PATENT DOCUMENTS

| | | |
|---|---|---|
| JP | 2006-318441 A | 11/2006 |
| JP | 2009-171497 A | 7/2009 |
| JP | 2010-039526 A | 2/2010 |
| JP | 2013-257695 A | 12/2013 |
| JP | 2014-191533 A | 10/2014 |

OTHER PUBLICATIONS

Notification of Reasons for Refusal received for Japanese Patent Application No. 2018-510532, dated Mar. 20, 2018, 10 pages including English Translation.

Decision to refusal received for Japanese Patent Application No. 2018-510532, dated Jul. 24, 2018, 6 pages including English Translation.

Decision to Grant a Patent received for Japanese Patent Application No. 2018-510532, dated Jan. 8, 2019, 5 pages including English Translation.

Office Action received for Taiwanese Application No. 107123311 on Aug. 21, 2019, 13 pp. including English Translation.

Office Action dated Jul. 31, 2020 in Chinese Patent Application No. 201780093484.0, 25 pages.

* cited by examiner

INFORMATION PROCESSING DEVICE AND INFORMATION PROCESSING METHOD

CROSS-REFERENCE TO RELATED APPLICATION

The present application is based on PCT filing PCT/JP2017/027741, filed Jul. 31, 2017, the entire contents of which are incorporated herein by reference.

FIELD

The present invention relates to an information processing device including multiple operating systems (OSs), and to an information processing method.

BACKGROUND

A real-time operating system (hereinafter referred to as real-time OS) is an OS that can perform a process within a specified time period, which is used primarily primarily to perform various processes requiring assurance that a time constraint is satisfied. Patent Literature 1 discloses a computer system having multiple OSs including a real-time OS. Including a real-time OS and a non-real-time OS in one information processing device enables both real-time performance and versatility to be provided.

CITATION LIST

Patent Literature

Patent Literature 1: Japanese Patent Application Laid-open No. 2013-257695

SUMMARY

Technical Problem

However, in the case of performing a series of processes across multiple OSs using the technique described in Patent Literature 1 listed above, it is required to take into consideration characteristics of a transmission destination OS to which data is transmitted, such as a latency time before a process starts, a time needed for a process to be performed, to transmit data. Therefore, there has been a need for adjustment of a timing of data processing and a timing of data transmission. In other words, synchronized data processing needs to be performed among the multiple OSs.

The present invention has been made in view of the foregoing circumstances, and its object is to provide an information processing device and an information processing method that enable synchronized data processing to be performed among multiple OSs.

Solution to Problem

In order to solve the above-mentioned problem and achieve the object, the present invention provides an information processing device comprising: a data input unit to receive time-series data from an external device; a first processing unit to add time information to data acquired from the data input unit and process the data to which the time information has been added, on a real-time operating system that performs a process within a specified time period; and a second processing unit to process the data to which the time information has been added, on a non-real-time operating system.

Advantageous Effects of Invention

An information processing device according to the present invention provides an advantage in that synchronized data processing can be performed among multiple OSs.

DESCRIPTION OF EMBODIMENTS

An information processing device and an information processing method according to an embodiment of the present invention will be described in detail below with reference to the drawings. Note that this embodiment is not intended to limit the scope of this invention.

Embodiment

Figure 1:
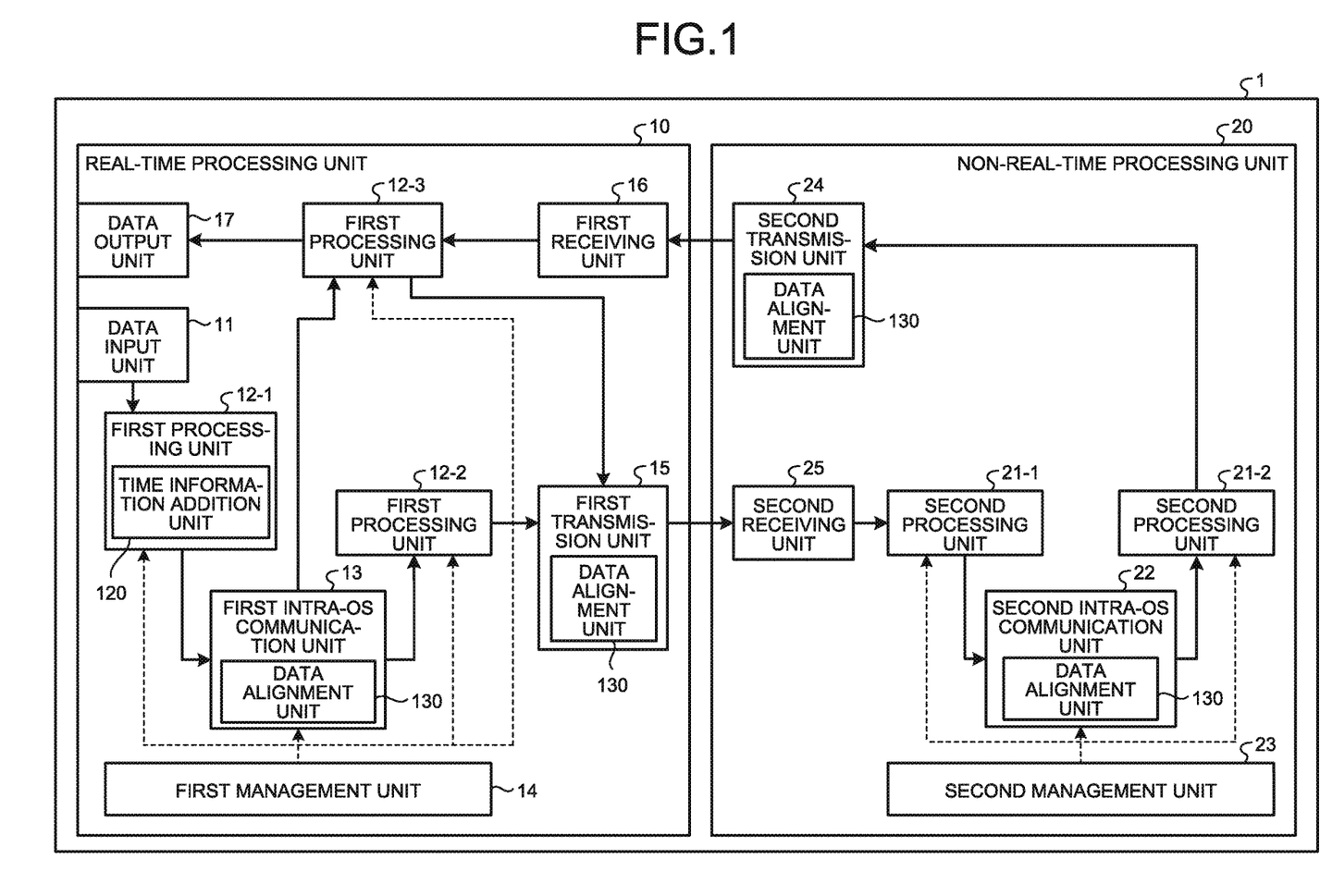
FIG. 1 is a diagram illustrating a functional configuration of an information processing device according to an embodiment of the present invention.

FIG. 1 is a diagram illustrating a functional configuration of an information processing device 1 according to an embodiment of the present invention. The information processing device 1 is a data processing device that processes industrial data relating to an operation of a manufacturing apparatus on a production site. The term "industrial data" refers to any data generated on any production site, which includes: data representing conditions of a production facility, such as temperatures, voltages, and electric currents in various parts of the production facility, distances between multiple portions of the production facility, a speed at which a drive unit is operated, the drive unit being equipped in the production facility, an operating time of the production facility, and the number of times of error occurrence in the production facility; data representing conditions, the number, and the like of workers involved in pre-operation preparatory work for the production facility; and data representing a production plan including a planned quantity of production. In addition, the term "industry" used in the present embodiment refers to industries in a broad sense, such as manufacturing industry, agriculture, and fishery. The term "industrial data" refers to data that is handled in the field of industry, but specifically in the field of manufacturing industry, refers to, for example, data handled in a factory, in an infrastructure management operation, in a warehouse, in a building, in an office, and in a residence. In connection with this, the term "production site" refers to a site where an apparatus for each of the industries is installed, and is not limited to a production site in a factory. The information processing device 1 performs data handling such as collection, processing, diagnosis, and notification of the industrial data. The information processing device 1 has a real-time OS and a non-real-time OS.

In this regard, a real-time OS can process data within a specified processing time, and is primarily used to perform a process in which data is required to be processed with high priority. A non-real-time OS cannot specify a processing time unlike a real-time OS, but has excellent extendability. Owing to availability of various application software programs runnable on a non-real-time OS, use of these existing application software programs can reduce efforts of developing a function to be performed by the information processing device 1. A non-real-time OS is used primarily to perform a complicate analysis processing and the like.

The information processing device 1 includes a real-time processing unit 10 that operates on a real-time OS, and a non-real-time processing unit 20 that operates on a non-real-time OS. The real-time processing unit 10 includes a data input unit 11, a first processing unit 12-1, another first processing unit 12-2, still another first processing unit 12-3, a first intra-OS communication unit 13, a first management unit 14, a first transmission unit 15, a first receiving unit 16, and a data output unit 17. The non-real-time processing unit 20 includes a second processing unit 21-1, another second processing unit 21-2, a second intra-OS communication unit 22, a second management unit 23, a second transmission unit 24, and a second receiving unit 25. The first intra-OS communication unit 13, the first transmission unit 15, the second intra-OS communication unit 22, and the second transmission unit 24 each include a data alignment unit 130.

Note that, in the following description, when no particular distinction needs to be made among the first processing unit 12-1, the first processing unit 12-2, and the first processing unit 12-3, they are each referred to as a first processing unit 12 generically. Similarly, when no particular distinction needs to be made among the second processing unit 21-1 and the second processing unit 21-2, they are each referred to as a second processing unit 21 generically.

The data input unit 11 is an input interface that receives data inputted on a time-series basis from an external device, as time-series data. The data input unit 11 inputs the received data to the first processing unit 12-1 connected to the data input unit 11. The first processing units 12 process the inputted data on the real-time OS. The number of the first processing units 12 included in the real-time processing unit 10 is not limited to the number as illustrated in the example of FIG. 1. The number of the first processing units 12 may be one or two, or four or more. Of the multiple first processing units 12, the first processing unit 12-1 connected to the data input unit 11 has a time information addition unit 120 which adds a time stamp that is time information to the data inputted from the data input unit 11. Note that the time information can be any information that is usable for the data alignment unit 130 to align data, and may be, not only time information represented by date and time such as "hh:mm:ss", for example, but also information represented by a sum of a predetermined time and an elapsed time, time information consisting of a simple elapsed time (e.g., 1111 seconds or a count value of 1111), or the like.

Figure 2:
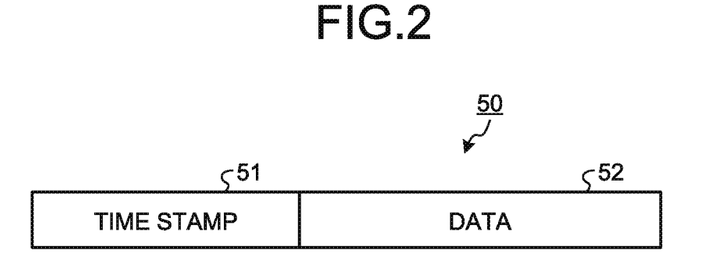
FIG. 2 is a diagram illustrating process data outputted by a time information addition unit illustrated in FIG. 1.

FIG. 2 is a diagram illustrating process data 50 outputted by the time information addition unit 120 illustrated in FIG. 1. The time information addition unit 120 adds a time stamp 51 to data 52 inputted from the data input unit 11 to generate the process data 50 that is data to be processed. In the process data 50, the time stamp 51 is added to a leading bit of the process data 50. The value of the time stamp 51 contained in the process data 50 will not be changed, and will thus be maintained having the same value with consistency during processing performed in the information processing device 1 after the addition of the time stamp. When the first processing unit 12-1 gives a command to collect data, the time information addition unit 120 can add, to the data 52, the time stamp 51 indicating date and time for a timing when the command to collect data has been given. Alternatively, the time information addition unit 120 may add, to the data 52, the time stamp 51 indicating date and time when the data 52 has been inputted in the first processing unit 12-1. Note that although the present embodiment is directed to adding the time stamp 51 to the leading bit of the process data 50, the time stamp 51 may also be added to a portion other than the leading bit of the process data 50.

The first processing units 12 each perform collection, processing, and diagnosis of data, notification of a diagnosis result, and the like. The first processing unit 12-1 connected to the data input unit 11 performs data collection processing, and the time information addition unit 120 included in the first processing unit 12-1 adds the time stamp 51 to the collected data. The first processing unit 12-2 and the first processing unit 12-3 which are not connected to the data input unit 11 perform processing and diagnosis of data, notification of a diagnosis result, and the like. Examples of the processing operation performed by the first processing units 12 include scaling and rounding of fractions of the collected data. The first processing units 12 are implemented by their respective application software programs that each operate independently on the real-time OS. The first intra-OS communication unit 13 relays communication between the first processing units 12. This allows output data of the first processing unit 12-1 to be input data to the first processing unit 12-2 and the first processing unit 12-3. The data alignment unit 130 of the first intra-OS communication unit 13 performs alignment processing to align the process data 50 based on the time stamp 51 so as to enable the process data 50 relayed between the first processing units 12 to be efficiently processed in a downstream one of the first processing units 12. The alignment processing is processing of rearranging pieces of data into a state without missing "associated data" that is data treated as data having the same date and time among multiple types of the process data 50 to be outputted to the same destination. The alignment processing is performed using interpolation, discarding, time shifting, and the like of the process data 50. The alignment processing will be described later in more detail.

The first management unit 14 controls the first processing units 12 and the first intra-OS communication unit 13, and manages the order of executions and the timings of operations of the multiple first processing units 12. The first management unit 14 selects input data to each of the first processing units 12 based on the time stamp 51. This configuration allows the first processing units 12 to process the data 52 based on the time stamp 51. The first transmission unit 15 is a transmitter that transmits data between the real-time OS and the non-real-time OS, and sends data from the real-time OS to the non-real-time OS. The first transmission unit 15 sends the process data 50 inputted from the first processing unit 12 to the second receiving unit 25. The data alignment unit 130 of the first transmission unit 15 performs alignment processing to enable the process data 50 to be efficiently processed in the non-real-time processing unit 20 on the receiving side. The alignment processing will be described later in more detail.

The first receiving unit 16 has a function of receiving the process data 50 transmitted between the OSs. The first receiving unit 16 receives the process data 50 sent by the second transmission unit 24 of the non-real-time processing unit 20. In the present embodiment, the first receiving unit 16 inputs the received process data 50 to the first processing unit 12-3, and the first processing unit 12-3 inputs the process data 50 that has been processed, to the data output unit 17. The data output unit 17 is an output interface that outputs the process data 50 to an external device. The first processing unit 12-3 has a function of, for example, a notification process to send a result of diagnosis processing based on the process data 50 for notification, and the data output unit 17 notifies a manufacturing apparatus or the like which is an example of an external device, of the diagnosis result.

Note that the first transmission unit 15 transmits the process data 50 to the second receiving unit 25 and the second transmission unit 24 transmits the process data 50 to the first receiving unit 16, but in fact, the information processing device 1 includes a memory 42 (see FIG. 7) configured to have a memory area for the real-time processing unit 10 and a memory area for the non-real-time processing unit 20, and the data is transmitted by transferring the process data 50 between these memory areas. In a case of sending the process data 50 from the first transmission unit 15 to the second receiving unit 25, a processor 41 (see FIG. 7) transfers the process data 50 stored in a memory area for the real-time processing unit 10 to a memory area for the non-real-time processing unit 20. Note that although the present embodiment is directed to providing both the memory area for the real-time processing unit 10 and the memory area for the non-real-time processing unit 20 in a common memory, a memory for the real-time processing unit 10 and a memory for the non-real-time processing unit 20 may also be separately provided.

The second processing unit 21 has a data processing function of processing the process data 50 on the non-real-time OS. The non-real-time processing unit 20 illustrated in FIG. 1 includes two second processing units 21. The number of the second processing units 21 included in the non-real-time processing unit 20 is not limited to the number as illustrated in the example of FIG. 1, and may also be one, or three or more. The second processing units 21 each perform, for example, processing of inputted data and a diagnosis processing. The second processing units 21 desirably each perform a process that is more complicated than data processing performed in the first processing units 12, and does not require real-time property. Examples of the processing performed by the second processing units 21 include noise processing, variable analysis, fast Fourier transform (FFT) processing, and data processing using deep learning. The function of each of the second processing units 21 is implemented by an application software program that runs on the non-real-time OS. Owing to wide versatility of the non-real-time OS, it can utilize and allow various application software programs used elsewhere to run on the non-real-time OS.

The second intra-OS communication unit 22 relays communication between the multiple second processing units 21. The second intra-OS communication unit 22 relays, for example, communication from the second processing unit 21-1 to the second processing unit 21-2. This allows output data of the second processing unit 21-1 to be input data to the second processing unit 21-2. The data alignment unit 130 of the second intra-OS communication unit 22 performs alignment processing to enable the process data 50 to be efficiently processed in the downstream one of the second processing units 21. The alignment processing will be described later in more detail.

The second management unit 23 controls the second processing units 21 and the second intra-OS communication unit 22, and manages the order of executions and the timings of operations of the multiple second processing units 21. The second management unit 23 selects input data to the second processing unit 21 based on the time stamp 51. This allows the second processing unit 21 to process the data on the basis of the time stamp 51. The second transmission unit 24 is a transmitter that sends data between the real-time OS and the non-real-time OS, which sends the data from the non-real-time OS to the real-time OS. The second transmission unit 24 sends data inputted from the second processing unit 21 to the first receiving unit 16. The data alignment unit 130 of the second transmission unit 24 performs alignment processing to enable the process data 50 to be efficiently processed in the real-time processing unit 10 on the receiving side. The alignment processing will be described later in more detail. The second receiving unit 25 is a receiver that receives the process data 50 sent by the first transmission unit 15 of the real-time processing unit 10. The second receiving unit 25 inputs the received process data 50 to the second processing unit 21. In the present embodiment, the second receiving unit 25 inputs the received process data 50 to the second processing unit 21-1.

In addition, although the present embodiment has the data input unit 11 and the time information addition unit 120 provided in the real-time processing unit 10, the present invention is not limited to such configuration. The data input unit 11 and the time information addition unit 120 may instead be provided in the non-real-time processing unit 20 to process the process data to which time information has been added by the non-real-time processing unit 20.

Figure 3:
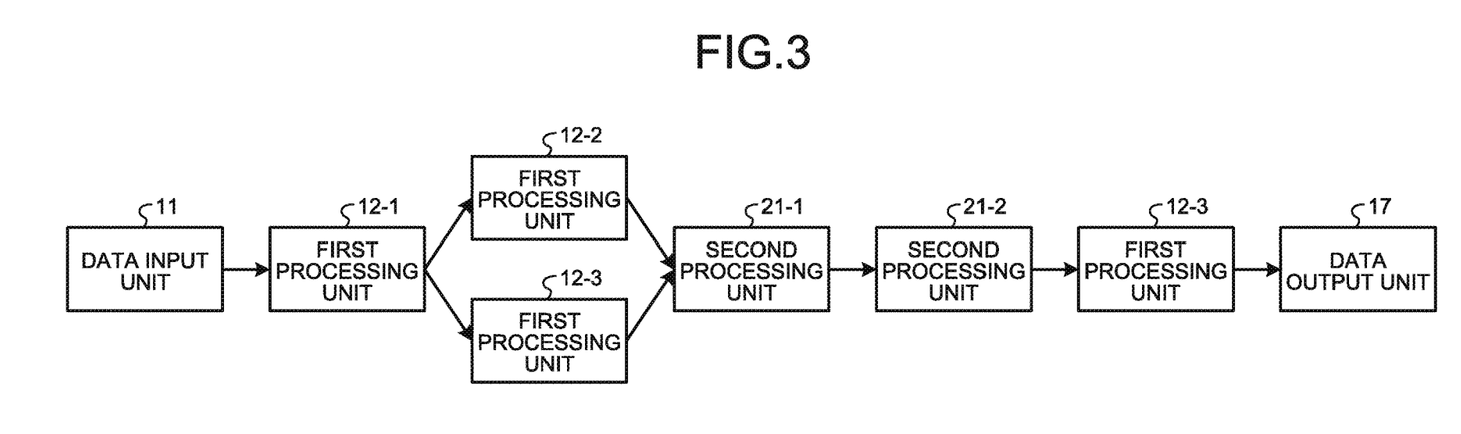
FIG. 3 is a diagram illustrating a flow of data in the information processing device illustrated in FIG. 1.

FIG. 3 is a diagram illustrating a flow of data in the information processing device 1 illustrated in FIG. 1. FIG. 3 illustrates a flow of data from the data input unit 11 through the first processing units 12 and the second processing units 21 to the data output unit 17.

Data inputted in the data input unit 11 of the information processing device 1 is inputted to the first processing unit 12-1. The time information addition unit 120 of the first processing unit 12-1 adds the time stamp 51 to the inputted data to generate the process data 50. The process data 50 outputted by the first processing unit 12-1 is inputted to the first processing unit 12-2 and the first processing unit 12-3. The first processing unit 12-2 and the first processing unit 12-3 each process the inputted process data 50, and output the processed data 50. The process data 50 outputted by each of the first processing unit 12-2 and the first processing unit 12-3 is inputted to the second processing unit 21-1. The second processing unit 21-1 processes the inputted process data 50, and outputs the processed process data 50. The process data 50 outputted by the second processing unit 21-1 is inputted to the second processing unit 21-2. The second processing unit 21-2 processes the inputted process data 50, and outputs the processed process data 50. The process data 50 outputted by the second processing unit 21-2 is inputted to the first processing unit 12-3. The first processing unit 12-3 processes the inputted process data 50, and outputs the processed process data 50. The process data 50 outputted by the first processing unit 12-3 is inputted to the data output unit 17. The data output unit 17 outputs the inputted process data 50 to an external device.

As illustrated in FIG. 3, the information processing device 1 may execute two or more processes parallelly with the process data 50 being branched for the parallel executions, and may also merge multiple results of processes to form an input for one process. The order of executions of the processes is determined by the first management unit 14 and the second management unit 23, and is therefore not necessarily limited to the order illustrated in FIG. 3. Thus, when no output data from the upstream process exists, the first intra-OS communication unit 13 and the second intra-OS communication unit 22 do not pass any data to the downstream process. This means that the downstream process skips the process. Otherwise, when multiple sets of transmission data are waiting in a congestion situation, the first management unit 14 and the second management unit 23 each pass data having the latest time stamp 51 to the downstream process. In a location where aggregation of the process data 50 is caused, such as the second processing unit 21-1 illustrated in FIG. 3, the second management unit 23 allows the process data 50 having the same time stamp 51 among output data from the first processing unit 12-2 and output data from the first processing unit 12-3 to be inputted in the second processing unit 21-1, so as to synchronize the input data sets. This enables streaming processing in which one set of process data 50 is synchronized with another set of process data 50 in the sequence of processing from the data input unit 11 to the data output unit 17.

Specific examples of alignment processing performed by the data alignment unit 130 owned by each of the first intra-OS communication unit 13, the first transmission unit 15, the second intra-OS communication unit 22, and the second transmission unit 24 will be described below. The term "downstream processing unit" as used in the following description refers to the first processing unit 12 in a case where the description is directed to the data alignment unit 130 included in the first intra-OS communication unit 13 or in the second transmission unit 24; and refers to the second processing unit 21 in a case where the description is directed to the data alignment unit 130 included in the second intra-OS communication unit 22 or in the first transmission unit 15. Note that the data alignment units 130 of the first intra-OS communication unit 13 and the second intra-OS communication unit 22 may be omitted.

Figure 4:
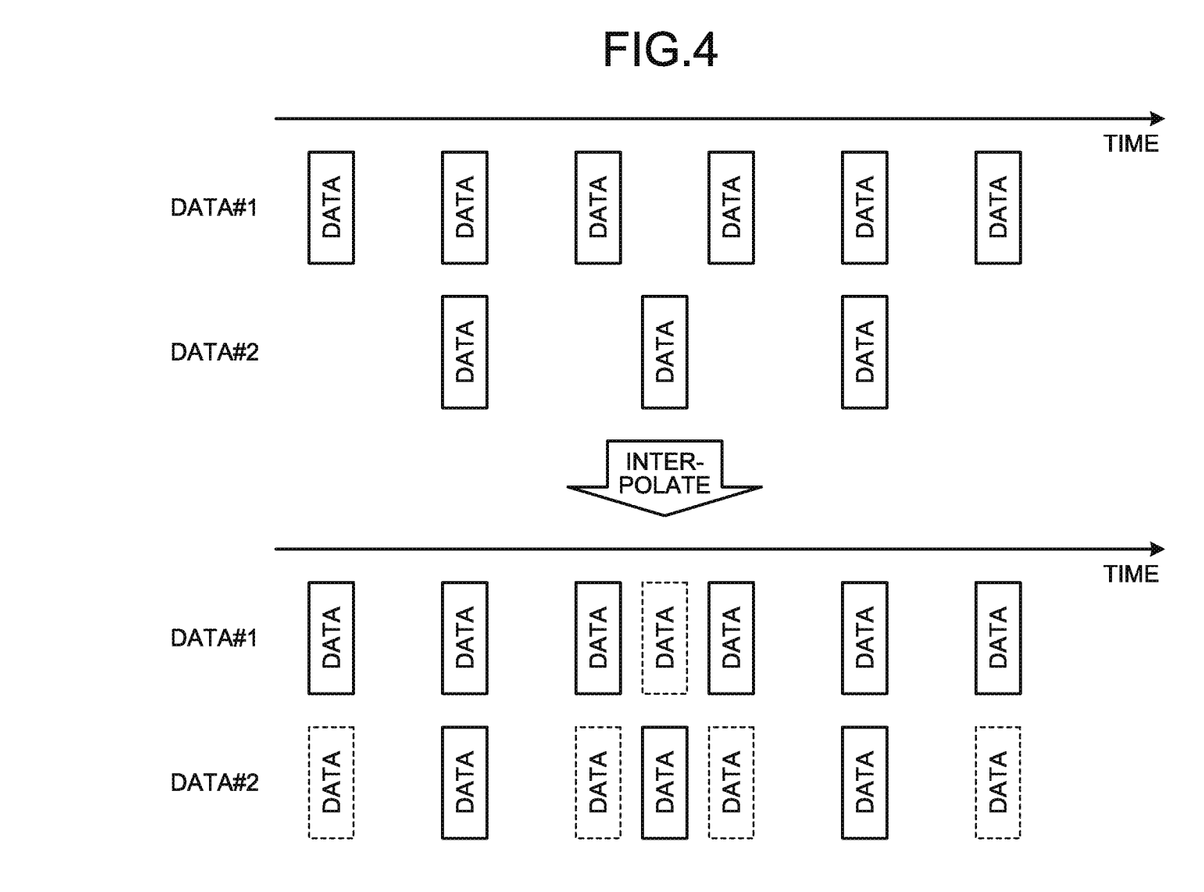
FIG. 4 is a chart illustrating a first example of alignment processing of process data, performed by a data alignment unit illustrated in FIG. 1.

FIG. 4 is a chart illustrating a first example of alignment processing of the process data 50, performed by the data alignment unit 130 illustrated in FIG. 1. The first example is directed to a process of filling in missing data using interpolation processing. In a case where the process data 50 having a time stamp 51 indicating the same date and time is missing in multiple types of process data 50 to be inputted to the downstream processing unit, the data alignment unit 130 performs interpolation processing of filling in the missing data, thereby making it possible to align the process data 50. Note that the process data 50 having the same date and time indicated by the time stamp 51 includes the process data 50 having a time stamp 51 having a difference in date and time within a predetermined range. A rectangle of a broken line of FIG. 4 represents data that is filled in by the interpolation. In a case where two types of process data 50 (data #1 and data #2) are to be sent to one and the same destination, when data #2 whose difference in date and time from the data #1 is within the predetermined range does not exist, the data alignment unit 130 makes up for data with data deemed to have the same date and time as date and time of the data #1. As interpolation processing, use can be made of for example, a method such as copying of past process data 50, zeroth-order interpolation thereof or first-order interpolation thereof. Zeroth-order interpolation, first-order interpolation, or the like requires use of data having a time stamp 51 later than that of the missing data, and therefore makes its processing time longer. For this reason, when real-time property of streaming processing to be performed is rather important, it is desirable to use a technique of copying past transmission data.

Figure 5:
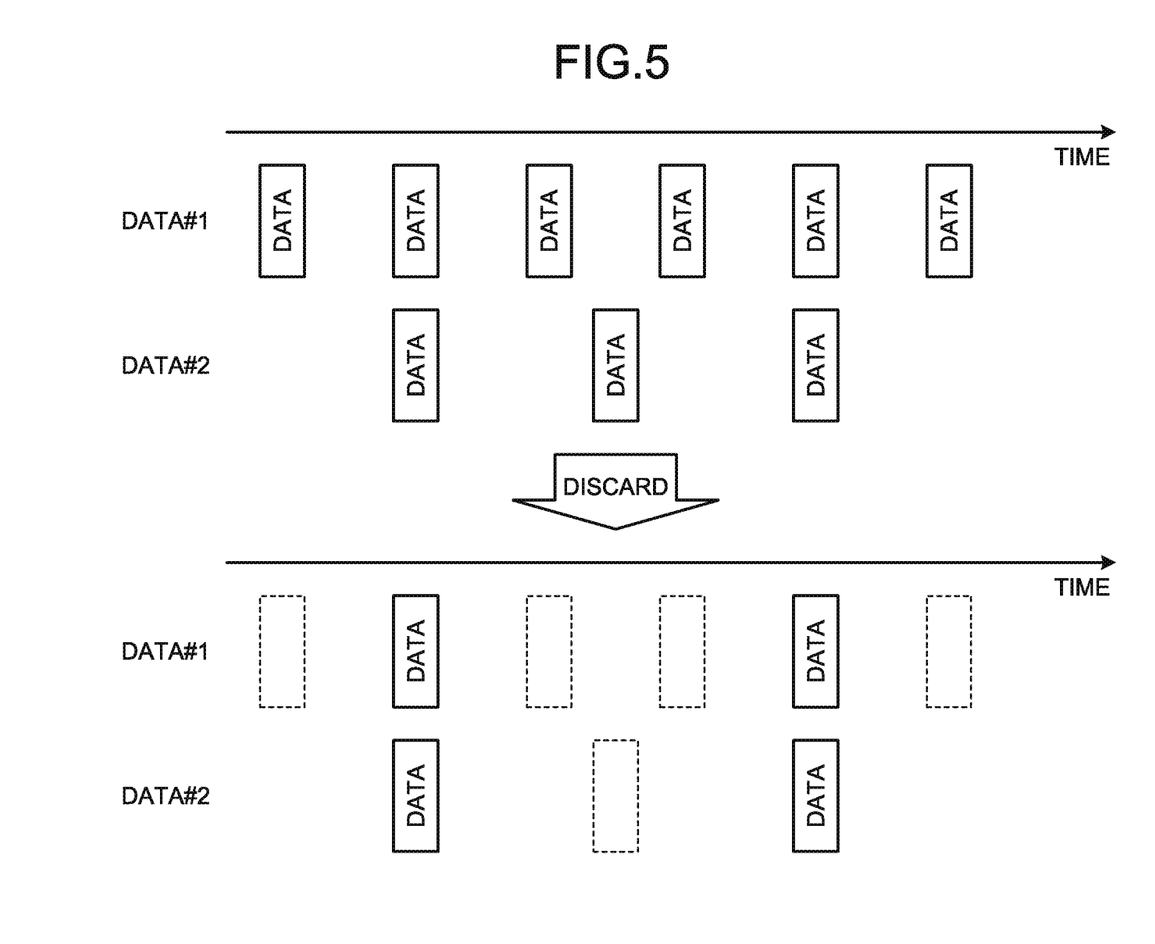
FIG. 5 is a chart illustrating a second example of alignment processing of process data, performed by the data alignment unit illustrated in FIG. 1.

FIG. 5 is a chart illustrating a second example of alignment processing of the process data 50, performed by the data alignment unit 130 illustrated in FIG. 1. The second example is directed to a process of leaving only process data 50 associated with the process data 50 having a time stamp 51 indicating the same date and time by discarding the process data 50. In a case where the process data 50 having a time stamp 51 indicating the same date and time is lacked in multiple types of process data 50 inputted to the downstream processing unit, the data alignment unit 130 performs processing of retaining pieces of the process data 50 associated with the process data 50 having a time stamp 51 indicating the same date and time while discarding the applicable pieces of the process data 50, thereby making it possible to align the process data 50. A rectangle of a broken line in FIG. 5 represents a discarded piece of data.

Figure 6:
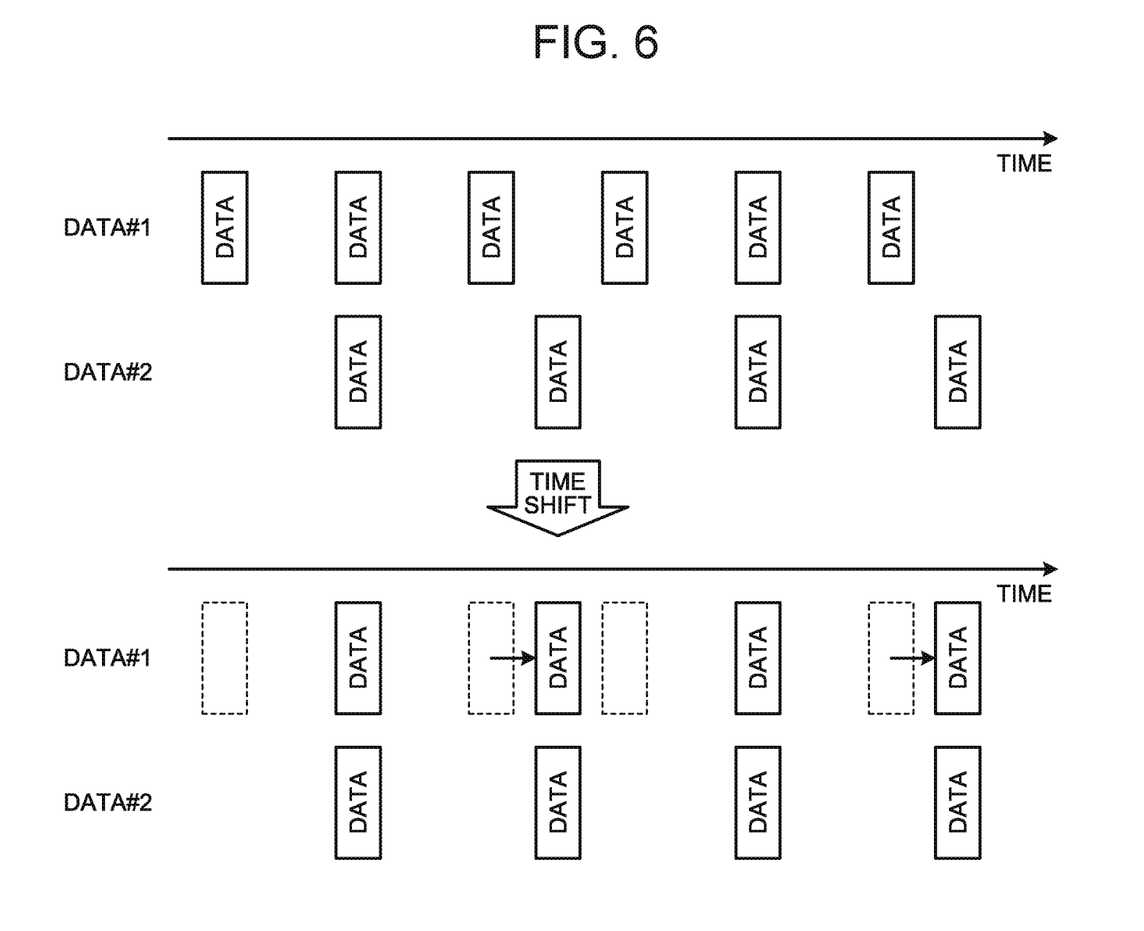
FIG. 6 is a chart illustrating a third example of alignment processing of process data, performed by the data alignment unit illustrated in FIG. 1.

FIG. 6 is a chart illustrating a third example of alignment processing of the process data 50, performed by the data alignment unit 130 illustrated in FIG. 1. The third example is directed to a process of making association between pieces of the process data 50 by time shifting. In a case where the process data 50 having a time stamp 51 indicating the same date and time is lacked in multiple types of process data 50 inputted to the downstream processing unit, the data alignment unit 130 time-shifts the process data 50 to make association of the pieces of the process data 50, thereby making it possible to align the process data 50. Note that the example of FIG. 6 also discards the process data 50 concurrently with the time-shifting. The said "time shift" does not refer to shifting the time stamp 51 of the process data 50, but means to associate pieces of the process data 50 containing their respective different time stamps 51 indicating different dates and times with each other using a flag or the like, so as to represent that the data pieces can be handled as data pieces having the same date and time.

Use of interpolation processing is advantageous in that the process data 50 is not lost, but increases the amount of data thereby increasing the amount of communication between processes. Discarding of pieces of the process data 50 makes the amount of data reduced, and is thus advantageous in that the amount of communication between processes can be reduced, but if there is no process data 50 having a time stamp 51 indicating the same date and time, this may result in a situation where the process data 50 is not transmitted at all. In addition, even if timings when pieces of the process data 50 are acquired in multiple kinds of process data 50 are matched with each other periodically, when such a period is long, the amount of data of the process data 50 may be reduced significantly. The data alignment unit 130 may use, in combination, at least two of interpolation, discarding, and time shifting of the transmission data.

Figure 7:
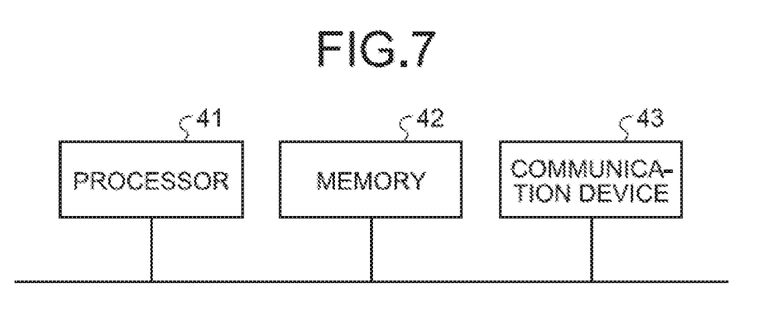
FIG. 7 is a diagram illustrating a hardware configuration of the information processing device illustrated in FIG. 1.

FIG. 7 is a diagram illustrating a hardware configuration of the information processing device 1 illustrated in FIG. 1. The function of the information processing device 1 can be implemented using the processor 41, the memory 42, and a communication device 43.

The processor 41 is a central processing unit (CPU), which is also called central processing device, processing device, computing device, microprocessor, microcomputer, digital signal processor (DSP), or the like. The memory 42 is, for example, a non-volatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disc, a digital versatile disk (DVD), or the like. The communication device 43 is a communication interface with an external device, which may be a wired communication interface or a wireless communication interface.

A function of each of the data input unit 11, the first processing units 12, the first intra-OS communication unit 13, the first management unit 14, the first transmission unit 15, the first receiving unit 16, and the data output unit 17 included in the information processing device 1 can be implemented by the processor 41 executing a computer program stored in the memory 42 on the real-time OS. The processor 41 can communicate with an external device based on the use of the communication device 43 during execution of the program. A function of each of the second processing units 21, the second intra-OS communication unit 22, the second management unit 23, the second transmission unit 24, and the second receiving unit 25 can be implemented by the processor 41 executing a computer program stored in the memory 42 on the non-real-time OS.

The hardware configuration of the information processing device 1 is not limited to a hardware configuration of a particular embodiment. For example, the information processing device 1 may include more than one processor 41, or may include a single multi-core processor 41. Alternatively, one single-core processor 41 may be used to run the real-time OS and the non-real-time OS in a time division manner.

As described above, according to the embodiment of the present invention, the information processing device 1 has the real-time OS and the non-real-time OS, and can thus unite real-time property and general versatility. This enables real-time data processing, and also enables utilization of existing resource to be made and processing in conjunction with an external tool to be performed.

In this information processing device 1, the first processing unit 12 operating on the real-time OS, namely, the first processing unit 12-1 connected to the data input unit 11 to which data is inputted from an external device has a time information addition unit 120. The time information addition unit 120 adds, to the inputted data, the time stamp 51 that is time information. The value of this time stamp 51 is not changed, and a consistent value thereof is maintained, during the subsequent processing in the information processing device 1.

By virtue of the above-described configuration, even if data to which no time stamp 51 is added is inputted to the information processing device 1, or even if a mixture of data to which the time stamp 51 is added in the external device and data to which no time stamp 51 is added is inputted to the information processing device 1, the time information addition unit 120 adds the time stamp 51 to all sets of data inputted to the information processing device 1 on a uniform basis, so that an accurate time stamp 51 can be added to the data. By performing processing based on the accurate time stamp 51 in processes on a later stage, synchronization can be achieved among multiple pieces of the process data 50 or among multiple types of processes.

The process data 50 that is data generated by addition of the time stamp 51 to data collected from an external device is processed in multiple data processing units including the first processing units 12 and the second processing units 21 in the information processing device 1. Specifically, the first intra-OS communication unit 13, the first transmission unit 15, the second intra-OS communication unit 22, and the second transmission unit 24 each select the process data 50 to be passed to a process on a later stage, based on the time stamp 51 thereof. Accordingly, a sequence of processes is performed across the real-time OS and the non-real-time OS based on the time stamp 51, and synchronized streaming processing can be realized among the multiple OSs.

In addition, the first intra-OS communication unit 13, the first transmission unit 15, the second intra-OS communication unit 22, and the second transmission unit 24 each perform alignment processing to align multiple types of process data 50. The alignment processing combines multiple pieces of the process data 50 that can be treated as identical records. This enables processing on a later stage to be executed without recognizing which pieces of data should be combined for the processing to be executed. Accordingly, efficient data processing can be executed.

The configuration described in the foregoing embodiment is merely an example of contents of the present invention, and may be combined with other publicly known techniques and partially omitted and/or modified without departing from the scope of the present invention.

REFERENCE SIGNS LIST

1 information processing device; 10 real-time processing unit; 11 data input unit; 12, 12-1, 12-2, 12-3 first processing unit; 13 first intra-OS communication unit; 14 first management unit; 15 first transmission unit; 16 first receiving unit; 17 data output unit; 20 non-real-time processing unit; 21, 21-1, 21-2 second processing unit; 22 second intra-OS communication unit; 23 second management unit; 24 second transmission unit; 25 second receiving unit; 41 processor; 42 memory; 43 communication device; 50 process data; 51 time stamp; 52 data; 120 time information addition unit; 130 data alignment unit.

The invention claimed is:

1. An information processing device comprising:
   data input circuitry to receive time-series data from an external device;
   first processing circuitry to add time information to data acquired from the data input circuitry and process the data to which the time information has been added, on a real-time operating system that performs a process within a specified time period;
   second processing circuitry to process the data to which the time information has been added, on a non-real-time operating system; and
   data alignment circuitry to perform alignment based on the time information by associating, with each other, pieces of data to be treated as data having the same time information in two or more types of data to be transmitted to a same destination before transmission of data to be transmitted between the first processing circuitry and the second processing circuitry, data to be transmitted between multiple ones of the first processing circuitry, or data to be transmitted between multiple ones of the second processing circuitry,
   wherein:
   the data alignment circuitry associates, with each other, pieces of data having their respective different time information pieces, while maintaining values of the time information pieces,
   when pieces of data outputted from the first processing circuitry, respectively, are inputted to the second processing circuitry, the pieces of data inputted from the first processing circuitry to the second processing circuitry are synchronized with one another based on the time information, the information processing device comprises a non-real-time processing unit which includes the second processing circuitry, and the information processing device comprises a real-time processing unit which include the first processing circuitry and another processing circuitry, said another processing circuitry which processes data which has been processed by the first processing circuitry and which processes data which has been processed by the second processing circuitry, wherein, in a case where data associated with the time information is missing among two or more types of data, the data alignment circuitry performs interpolation processing to fill in the data missing.

2. The information processing device according to claim 1, wherein, in a case where data associated with the time information is missing among two or more types of data, the data alignment circuitry associates data having a different value for the time information with the data missing, to fill in the data missing.

3. The information processing device according to claim 1, wherein the first processing circuitry and the second processing circuitry process data based on the time information.

4. The information processing device according to claim 3, further comprising:
a first management circuitry to control an operation timing of the first processing circuitry; and
a second management circuitry to control an operation timing of the second processing circuitry,
wherein the first management circuitry and the second management circuitry select input data to the first processing circuitry and the second processing circuitry based on the time information.

5. The information processing device according to claim 1, wherein the first processing circuitry connected to the data input circuitry performs a data collection process of collecting data from the external device.

6. The information processing device according to claim 5, wherein the first processing circuitry connected to the data input circuitry sets, as the time information, a time when an instruction to collect data has been issued to the external device, or a time when data has been received from the external device.

7. An information processing method in an information processing device including a real-time operating system that performs a process within a specified time period and a non-real-time operating system, comprising:
adding time information to data that has been inputted from an external device, in a first processing circuitry, the first processing circuitry operating on the real-time operating system; and performing alignment based on the time information by associating, with each other, pieces of data to be treated as data having the same time information in two or more types of data to be transmitted to a same destination before transmission of data to be transmitted between the first processing circuitry and a second processing circuitry operating on the non-real-time operating system, data to be transmitted between multiple ones of the first processing circuitry, or data to be transmitted between multiple ones of the second processing circuitry, wherein:
in the performing alignment, pieces of data having their respective different time information pieces are associated with each other, while maintaining values of the time information pieces, when pieces of data outputted from the first processing circuitry, respectively, are inputted to the second processing circuitry, the pieces of data inputted from the first processing circuitry to the second processing circuitry are synchronized with one another based on the time information, the method further comprises receiving and processing by another processing circuit which utilizes the real-time operating system, data processed by the first processing circuitry using the real-time operating system and data processed the second processing circuitry using the non-real-time operating system, wherein, in a case where data associated with the time information is missing among two or more types of data, the performing alignment includes performing interpolation processing to fill in the data missing.

8. The information processing method according to claim 7, wherein, in a case where data associated with the time information is missing among two or more types of data, the performing alignment includes:
associating data having a different value for the time information with the data missing, to fill in the data missing.

9. The information processing method according to claim 7, wherein the first processing circuitry and the second processing circuitry process data based on the time information.

10. The information processing method according to claim 7, further comprising:
performing, by the first processing circuitry, a data collection process of collecting data from the external device.

11. The information processing method according to claim 10, further comprising:
setting, by the first processing circuitry, as the time information, a time when an instruction to collect data has been issued to the external device, or a time when data has been received from the external device.

* * * * *